(12) United States Patent
Cunningham et al.

(10) Patent No.: US 7,690,075 B2
(45) Date of Patent: Apr. 6, 2010

(54) CENTRAL VACUUM CLEANER CONTROL, UNIT AND SYSTEM WITH CONTAMINANT SENSOR

(75) Inventors: J. Vern Cunningham, Aurora (CA); Allen D. Muirhead, Aurora (CA)

(73) Assignee: Cube Investments Limited, Aurora (CA)

( * ) Notice: Subject to any disclaimer, the term of this patent is extended or adjusted under 35 U.S.C. 154(b) by 1157 days.

(21) Appl. No.: 11/245,218

(22) Filed: Oct. 7, 2005

(65) Prior Publication Data

US 2007/0079468 A1    Apr. 12, 2007

(51) Int. Cl.
*A47L 5/38*    (2006.01)
(52) U.S. Cl. .............................. 15/314; 15/301; 15/319; 15/339
(58) Field of Classification Search ...................... 15/31, 15/313–315, 319, 339; *A47L 5/38, 9/28*
See application file for complete search history.

(56) References Cited

U.S. PATENT DOCUMENTS

| | | | |
|---|---|---|---|
| 5,067,394 A | 11/1991 | Cavallero | |
| 5,276,434 A * | 1/1994 | Brooks et al. | 340/632 |
| 5,893,194 A * | 4/1999 | Karmel | 15/314 |
| 2008/0222836 A1 * | 9/2008 | Cunningham | 15/314 |
| 2008/0301903 A1 * | 12/2008 | Cunningham et al. | 15/410 |

FOREIGN PATENT DOCUMENTS

WO    WO 2005/031169 A1    4/2005

* cited by examiner

*Primary Examiner*—David A Redding
(74) *Attorney, Agent, or Firm*—Dowell & Dowell, P.C.

(57) ABSTRACT

A central vacuum cleaning system 3 has a central vacuum unit 17 with a motor 10, a motor compartment 19, and a vacuum chamber 25. The system 3 also has a control circuit 1 for controlling power to the motor 10, and one or more airborne contaminant sensors 15 for sensing contaminants within the system 3. The sensors 15 may be located in pipes 31 motor compartment 19, vacuum chamber 25 and hose handle 34. Vacuum air may be drawn through aperture 37 in wall valve 38.

25 Claims, 2 Drawing Sheets

CENTRAL VACUUM CLEANER CONTROL, UNIT AND SYSTEM WITH CONTAMINANT SENSOR

FIELD OF THE INVENTION

The invention relates to central vacuum cleaning systems.

BACKGROUND OF THE INVENTION

Central vacuum cleaning systems were originally quite simple. One placed a powerful central vacuum source external to the main living space. The source was connected through interior walls to a long flexible hose that terminated in a handle and nozzle. When an operator desired to use the system, the operator went to the source and turned it on. The operator then went inside, picked up the handle and directed the nozzle to an area to be cleaned.

Although many elements of the basic system remain, many improvements have been made. Rigid pipes typically run inside interior walls to numerous wall valves spaced throughout a building. This allows an operator to utilize a smaller hose while covering an equivalent space. This is an advantage as the hose can be quite bulky and heavy.

Various communication systems have been developed. Some systems sense sound or pressure in the pipes to turn the vacuum source on or off, see for example U.S. Pat. No. 5,924,164 issued 20 Jul. 1999 to Edward W. Lindsay under title ACOUSTIC COMMUNICATOR FOR CENTRAL VACUUM CLEANERS. Other systems run low voltage wires between the source and the wall valve. The source can be turned on and off at a wall valve by a switch that may be activated by insertion or removal of the hose. The hose may also contain low voltage wires to allow the source to be controlled from a switch in the handle, see for example U.S. Pat. No. 5,343,590 issued 6 Sep. 1994 to Kurtis R. Radabaugh under title LOW VOLTAGE CENTRAL VACUUM CONTROL HANDLE WITH AN AIR FLOW SENSOR. The switch can be a simple toggle switch, or a more sophisticated capacitive switch.

The low voltage wires running along the pipes can be replaced by conductive tape or the like on the pipes, see for example U.S. Pat. No. 4,854,887 issued 8 Aug. 1989 to Jean-Claude Blandin under title PIPE SYSTEM FOR CENTRAL SUCTION CLEANING INSTALLATION. Separate low voltage conductors in the walls can be avoided altogether by home using mains power wires to transmit communication signals between the wall valve and the source, see for example U.S. Pat. No. 5,274,878 issued 4 Jan. 1994 to Kurtis R. Radabaugh et al under title REMOTE CONTROL SYSTEM FOR CENTRAL VACUUM SYSTEMS. A handheld radio frequency wireless transmitter can be used by an operator to turn the source on or off, see for example U.S. Pat. No. 3,626,545 issued 14 Dec. 1971 to Perry W. Sparrow under title CENTRAL VACUUM CLEANER WITH REMOTE CONTROL.

Line voltage can be brought adjacent the vacuum wall valves and connected to the handle through separate conductors, or integrated spiral wound conductors on the hose. Line voltage can then be brought from the handle to powered accessories, such as an electrically-powered beater bar, connected to the nozzle. Line voltage can be switched on and off to the powered accessory using the same switch in the handle that controls the source. Alternatively, the powered accessory may have its own power switch. It has been proposed to use the pipes of central vacuum cleaning systems to evacuate contaminants sensed by sensors in rooms to which the pipes are connected.

A control module mounted to the central vacuum unit is typically used to control the vacuum source.

As central vacuum cleaning systems have become more and more sophisticated, so has the control module.

Improvements to, or additional or alternative features for, central vacuum cleaning systems are desirable.

SUMMARY OF THE INVENTION

In a first aspect the invention provides a central vacuum cleaning system control module for use in a central vacuum cleaning system having a central vacuum unit with a motor in a motor compartment. The module includes a control circuit controlling power to the motor. It also includes one or more airborne contaminant sensors in the control circuit for sensing airborne contaminants. The control module is dimensioned to fit within the motor compartment In a second aspect the invention provides a central vacuum unit for use in a central vacuum cleaning system. The unit includes a motor compartment, a vacuum chamber, a control circuit for controlling power to the motor, and one or more airborne contaminant sensors for sensing contaminants within the unit.

In a third aspect the invention provides a central vacuum cleaning system. The system includes a central vacuum unit having a motor, a motor compartment, a vacuum chamber, a control circuit for controlling power to the motor, and one or more airborne contaminant sensors for sensing airborne contaminants within the central vacuum cleaning system.

The at least one sensor may be located to sense airborne contaminants within vacuum air pipes of the system. The at least one sensor may be located in the suction vacuum air pipes of the system. The at least one sensor may be located in the exhaust vacuum air pipes of the system. The at least one sensor may be located to sense airborne contaminants within the motor compartment of the central vacuum unit.

The at least sensor may be mounted in a cooling air path of the motor after the motor. The control circuit may also include a control module that controls power to the motor. The at least one sensor may be mounted on the control module. The control module may be mounted within the motor compartment.

The control module may be mounted in a cooling air path of the motor. The control module may be affixed to the suction device. The control module may be affixed to the motor. The at least one sensor may be mounted in the suction chamber.

The one sensor may be a smoke sensor. The at least one sensor may be a carbon monoxide sensor.

In a fourth aspect the invention provides a method of sensing airborne contaminants. The method includes running a central vacuum unit of a central vacuum cleaning system to draw air through the unit, and sensing for contaminants within the central vacuum cleaning system.

The step of sensing may include sensing contaminants in a vacuum air path of the central vacuum cleaning system. The step of sensing may include sensing contaminants in an intake side of the vacuum air path. The step of sensing may include sensing contaminants in an exhaust side of the vacuum air path. The step of sensing may include sensing contaminants in a cooling air path of the central vacuum cleaning system. The step of sensing may include sensing for contaminants in the cooling air path after a motor of the central vacuum cleaning system.

The step of sensing may include sensing for smoke. The step of sensing may include sensing for carbon monoxide.

Other aspects of the invention will be evident from the drawings and description herein.

BRIEF DESCRIPTION OF THE DRAWINGS

For a better understanding of the present invention and to show more were clearly how it may be carried into effect, reference will now be made, by way of example, to the accompanying drawings which show the preferred embodiment of the present invention and in which.

DETAILED DESCRIPTION OF THE PREFERRED EMBODIMENT

Figure 1:
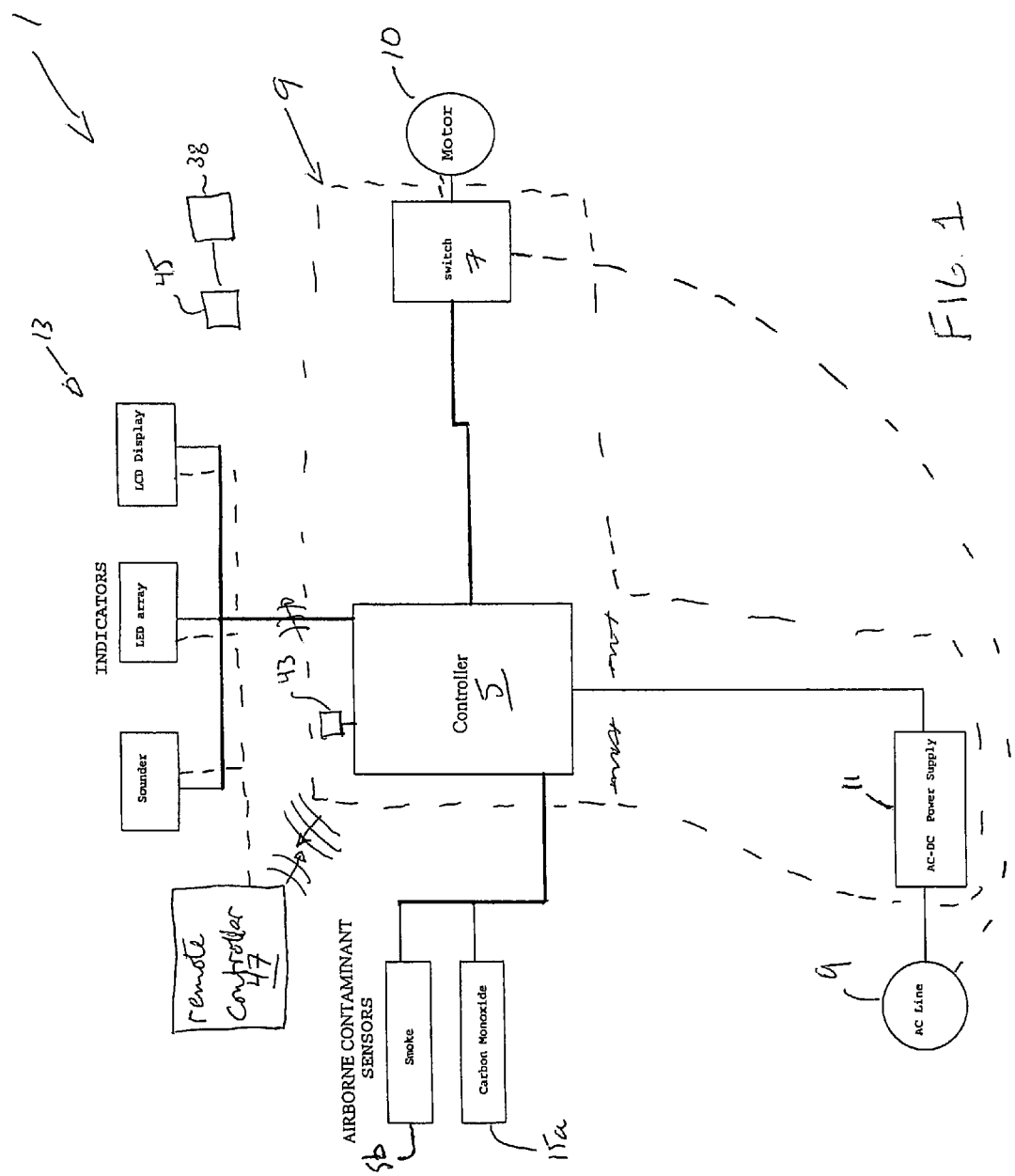
FIG. 1 is a block diagram of a control circuit for a central vacuum cleaning system in accordance with a preferred embodiment of the present invention.

Referring to FIG. 1, an example block diagram of a control circuit 1 for a central vacuum cleaning system 3 (see FIG. 2) is shown. The control circuit 1 has a controller 5 and a switch 7 for controlling line power 9 to the motor 10. The controller 5 and switch 7 form a control module 9 and are usually provided on a single printed circuit board 10a. The control module 9 typically includes an AC-DC power supply 11 for powering the controller 5 and other components. Optional indicators 13 are provided in the circuit 1 for communication with a user.

Airborne contaminant sensors indicated in this description generally as 15i, 15ii, etc., and different example contaminant type sensors as 15a, 15b form part of the control circuit 1. The sensors 15 provide input to the controller 5. The controller 5 may utilize inputs from the sensors 15 in any way desirable, for example, the controller 5 may control the motor 10 in accordance with input from the sensors 15. As a further example, the controller 5 may communicate with a user through the indicators 13 to provide an indication of sensed contaminant. An indication may be in the form of an audible or visible alarm. It may indicate the actual contaminant in text or icon form.

An airborne contaminant is a gas or minute particle that is inherently airborne. The vacuum cleaning system 3 may act as a conduit to a sensor 15. This configuration is to be distinguished from existing so-called "dirt sensors", which detect comparatively large particles that are airborne as a result of the airflow induced by a vacuum system. Such "dirt sensors" typically use acoustic or photoelectric means of detection. Airborne contaminants may include, for example, Combustible Gases, such as LP-Gas/Propane, Natural gas/Methane; General combustible gas, such as Hydrogen, Toxic Gases, Carbon monoxide, Ammonia, Hydrogen sulfide; Organic Solvents, such as Alcohol, toluene, xylene; Other volatile organic vapors, such as CFCs (HCFCs and HFCs), R-22, R-113, R-21-R-22, R-134a,R-22, Other refrigerant gases; Indoor Pollutants, such as Carbon dioxide, Air contaminants; Automobile Ventilation, such as Gasoline exhaust, Gasoline and diesel exhaust; Cooking Vapors, such as Volatile vapors from food (alcohol), Water vapors from food; radon; allergens and other contaminants that may be found in an environment where a central vacuum cleaning system would be installed.

Sensor 15 may be a solid-state semi-conductor gas sensor. The resistance and capacitance of a semi-conductor gas sensor changes when reacting on specific gases. An example of such a sensor is a TGS 2600 from Figaro USA, Inc. of Glenview, Ill. This sensor detects hydrogen and carbon monoxide, which exist in cigarette smoke. Figaro USA, Inc., provides many other sensors that could be used.

Figure 2:
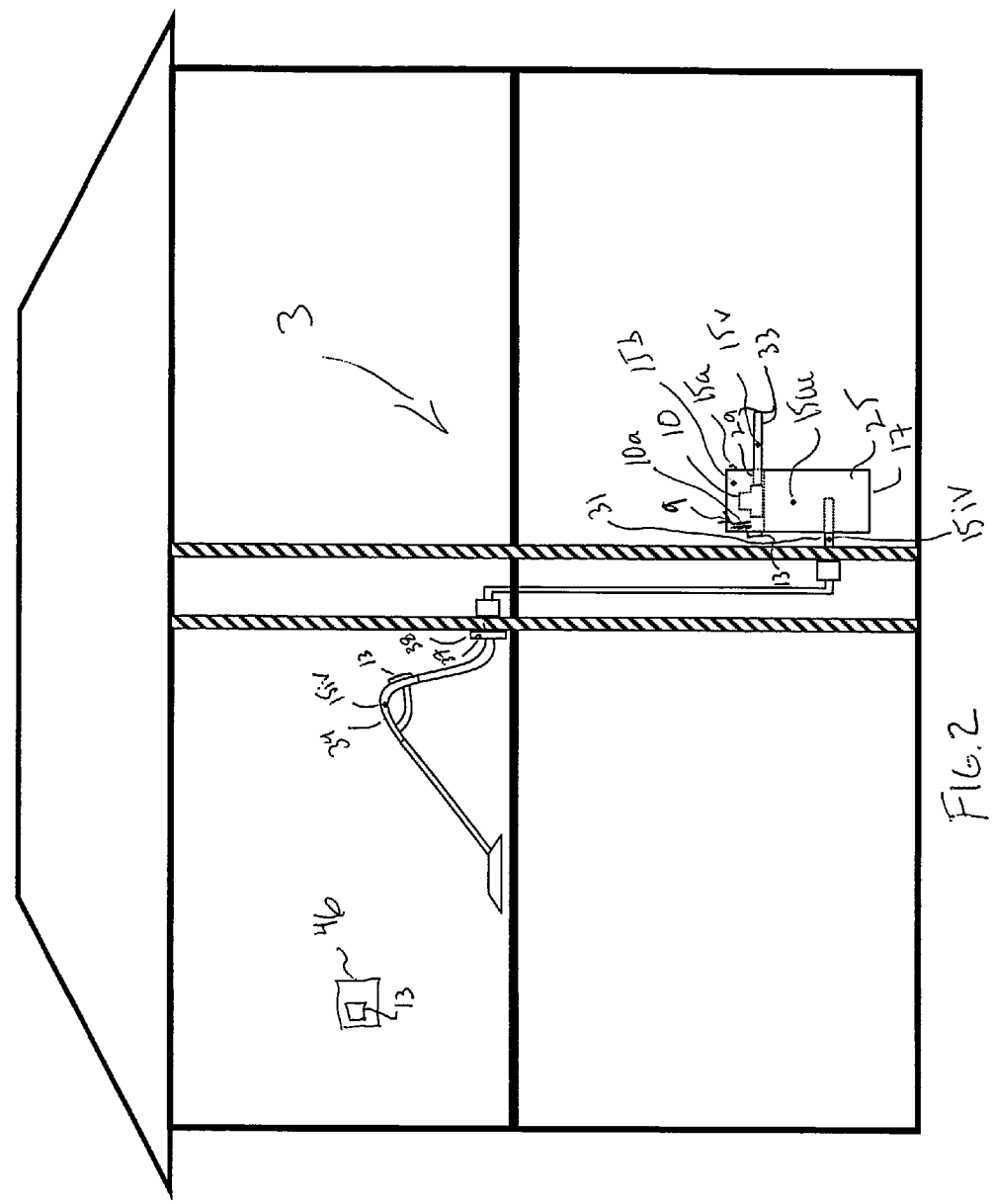
FIG. 2 is a cross-section of a dwelling incorporating the central vacuum cleaning system of FIG. 1.

Referring to FIG. 2, the sensors 15 may be mounted internally in a central vacuum unit 17 or externally. Externally mounted sensors 15i are preferably affixed, directly or indirectly, to the central vacuum unit 15 for ease of installation. Externally mounted sensors 15i affixed to the central vacuum unit would be useful particularly in sensing the environment in which the unit 17 is installed, typically a garage, basement, or utility room. In a garage or area where combustion appliances are operated, a carbon monoxide or other exhaust sensor 15a may be appropriate.

An internally mounted sensor 15ii may be mounted within a motor compartment 19 such that air conditions in the environment in which the unit 17 is installed may be sensed as cooling air is drawn through the unit 17. Also, a sensor 15ii mounted in the motor compartment 19 can sense more readily any contaminants being produced within the motor compartment 19, for example a smoke sensor 15b can sense smoke that indicates the beginning of a fire or overheating of the motor 10.

It may be preferable to directly mount the sensor 15ii in a cooling air path of the motor 10 to sense contaminants passing through or emanating from the motor 10. To sense contaminants emanating from the motor 10 then a sensor 15 mounted in the cooling air path would best be mounted in the cooling air path after cooling air passes through the motor 10.

The sensor 15 could be mounted within the vacuum air path of the cleaning system 3, either on the suction side 21 or the exhaust side 23, internally or externally.

An internal suction vacuum air path sensor 15iii may be mounted in a vacuum chamber 25 of the unit 17, ahead of or behind any filters. An internally mounted exhaust vacuum air sensor 15 may be mounted through the exhaust horn 29.

Externally mounted suction sensors 15iv or exhaust vacuum air sensor 15v can be mounted, for example, through intake pipes 31 or exhaust pipes 33 for vacuum air or through handle 34. In any of the above configurations the sensors 15 themselves may be mounted away from the area to be sensed with fluid connection provided to the area to be sensed, for example, through a tube or other conduit.

The sensor 15 may be controlled such that it is only activated while the motor 10 is activated. This would be appropriate where conditions may only be sensed when the motor 10 is in use. For example where operation of a vacuum cleaning system 3, and a resulting vacuum (particularly in "airtight homes"), may exacerbate conditions that lead to the generation of carbon monoxide from combustion appliances.

As an alternative example, the sensor 15 and the related portion of the control circuit 1 may be always on. This would be appropriate, for example, where conditions are dangerous, and may be sensed, independent of the use of the cleaning system, for example if smoke were to exist in the location in which the unit 17 is installed.

By mounting the sensor 15 to sense from the vacuum air path it is possible to sense remote locations. These locations may be sensed when the cleaner is in use. Alternatively, apertures 37 in remote wall valves 38 can allow air to be drawn through the pipes 31 to the sensor 15 when the vacuum cleaning system is not in use at the wall valve 38 for cleaning. The apertures 37 could be always open and very small such that suction for cleaning would not be adversely affected.

Alternatively, the apertures 37 could be switchable between an open position and closed position. The open position used for sensing and the closed position used when the vacuum cleaning system 3 is in operation for cleaning. Switching could be performed manually. Alternatively, switching could be performed automatically when the cleaning system 3 is to be used in operation for cleaning. For example, switching of the aperture 37 could be wirelessly activated through a wireless radio frequency transmitter 43 connected to the controller 5 and a wireless radio frequency receiver 45 connected to the wall valve 38.

The wall valve 38 could be switchable to open the vacuum air path if a sensor 15 senses a contaminant through an aperture 37. This could allow for automatic remote sensing and evacuation of an area utilizing a central vacuum cleaning system 3.

The controller 5 can be made up of discrete components to provide the logic functions described herein in a manner that would be evident to a person skilled in the art. Preferably, the controller 5 is a microprocessor with internal memory and one or more computer programs that together provide the logic functions described herein. The selection of an appropriate microprocessor will be a design choice depending on many factors such as cost, size, and number and complexity of functions desired.

The indicators 13 may be at the vacuum unit 17, the hose handle 34, or a remote location such as wall display 46. Communication to the indicators 13 may be wired or wireless radio frequency. It may be through a remote controller 47 with radio frequency receive capability and, possibly, transmit capability. The sensor 15 and indicators 13 may be part of a contaminant sensing circuit, not shown, with its own controller and source of power to provide similar functionality to that previously described. For example, the separate contaminant sensing could be located entirely within the hose handle 34 to provide a direct alarm to a user.

It will be understood by those skilled in the art that this description is made with reference to the preferred embodiment and that it is possible to make other embodiments employing the principles of the invention which fall within its spirit and scope as defined by the following claims.

We claim:

1. A central vacuum cleaning system control module for use in a central vacuum cleaning system having a central vacuum unit with a motor in a motor compartment, the module comprising:
   a) a control circuit controlling power to the motor; and
   b) one or more airborne contaminant sensors in the control circuit for sensing airborne contaminants,
   wherein the control module is dimensioned to fit within the motor compartment.

2. A central vacuum unit for use in a central vacuum cleaning system, the unit comprising:
   a) a motor compartment,
   b) a vacuum chamber,
   c) a control circuit for controlling power to the motor, and
   d) one or more airborne contaminant sensors for sensing contaminants within the unit.

3. A central vacuum cleaning system comprising:
   a) a central vacuum unit including a motor, a motor compartment, a vacuum chamber, a control circuit for controlling power to the motor, and
   b) one or more airborne contaminant sensors for sensing airborne contaminants within the central vacuum cleaning system.

4. The system of claim 3 wherein at least one sensor is located to sense airborne contaminants within vacuum air pipes of the system.

5. The system of claim 4 wherein at least one sensor is located in the suction vacuum air pipes of the system.

6. The system of claim 4 wherein at least one sensor is located in the exhaust vacuum air pipes of the system.

7. The system of claim 3 wherein at least one sensor is located to sense airborne contaminants within the motor compartment of the central vacuum unit.

8. The system of claim 7 wherein at least sensor is mounted in a cooling air path of the motor after the motor.

9. The system of claim 3 wherein the control circuit further comprises a control module that controls power to the motor.

10. The system of claim 9 wherein at least one sensor is mounted on the control module.

11. The system of claim 10 wherein the control module is mounted within the motor compartment.

12. The system of claim 11 wherein the control module is mounted in a cooling air path of the motor.

13. The system of claim 12 wherein the control module is affixed to the suction device.

14. The system of claim 12 wherein the control module is affixed to the motor.

15. The system of claim 3 wherein at least one sensor is mounted in the suction chamber.

16. The system of claim 3 wherein at least one sensor is a smoke sensor.

17. The system of claim 3 wherein at least one sensor is a carbon monoxide sensor.

18. A method of sensing airborne contaminants comprising:
   a) running a central vacuum unit of a central vacuum cleaning system to draw air through the unit, and
   b) sensing for contaminants within the central vacuum cleaning system.

19. The method of claim 18 wherein the step of sensing comprises sensing contaminants in a vacuum air path of the central vacuum cleaning system.

20. The method of claim 18 wherein the step of sensing comprises sensing contaminants in an intake side of the vacuum air path.

21. The method of claim 18 wherein the step of sensing comprises sensing contaminants in an exhaust side of the vacuum air path.

22. The method of claim 18 wherein the step of sensing comprises sensing contaminants in a cooling air path of the central vacuum cleaning system.

23. The method of claim 22 wherein the step of sensing comprises sensing for contaminants in the cooling air path after a motor of the central vacuum cleaning system.

24. The method of claim 18 wherein the step of sensing comprising sensing for smoke.

25. The method of claim 18 wherein the step of sensing comprising sensing for carbon monoxide.

* * * * *